Sept. 8, 1970 E. PRUVOT ET AL 3,527,082
APPARATUS FOR DETECTING THE END POINT
IN CLOUD POINT DETERMINATION
Filed Sept. 21, 1967 2 Sheets-Sheet 1
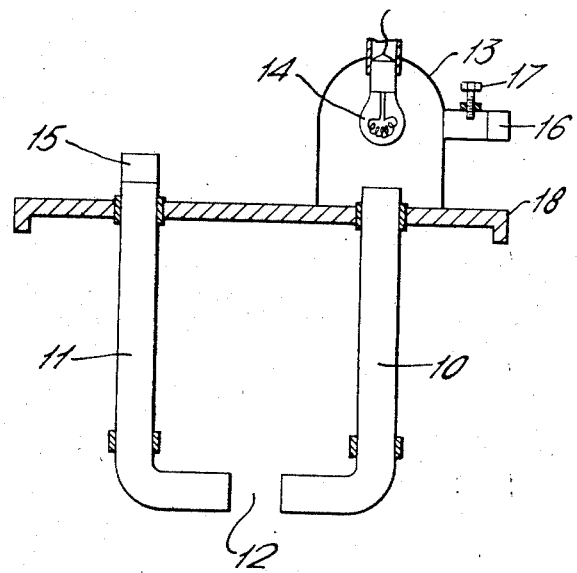
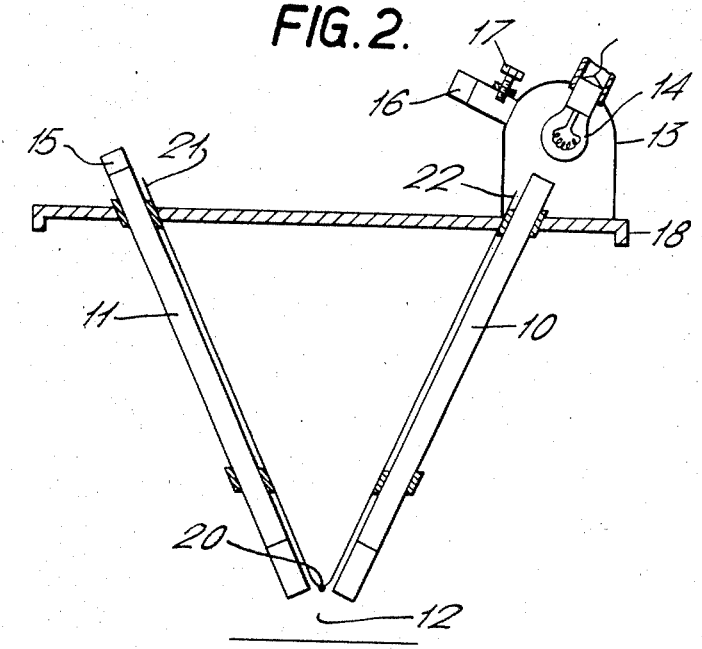
INVENTORS
EUGENE PRUVOT
NORMAN EVANS
BY GORDON JOHN SMITH
MORGAN, FINNEGAN, DURHAM & PINE
ATTORNEYS

United States Patent Office 3,527,082
Patented Sept. 8, 1970

3,527,082
APPARATUS FOR DETECTING THE END POINT IN CLOUD POINT DETERMINATION
Eugene Pruvot, Courbevoie, Hauts-de-Seine, France, and Norman Evans, Walton, and Gordon J. Smith, Shepperton, England, assignors to The British Petroleum Company Limited, London, England, a corporation of England
Filed Sept. 21, 1967, Ser. No. 669,524
Claims priority, application Great Britain, Sept. 27, 1966, 42,987/66
Int. Cl. G01n 25/02
U.S. Cl. 73—17
13 Claims

ABSTRACT OF THE DISCLOSURE

An end point detector for a cloud point monitor in which light is passed from a primary to a secondary light guide. At the end point wax begins to precipitate and the consequent reduction of output light intensity is detected.

Preferably the light is reflected off the base of the same container.

---

This invention relates to a detector for detecting the end point in cloud point determination and apparatus comprising it.

Cloud point determinations are carried out by cooling a sample which is observed for the first precipitation of solid material, e.g. wax in the case of a petroleum oil. In this specification the first formation of solid material will be called the "end point" of the determination and the object of the test is to record the temperature of the end point. This invention provides a detector which detects the end point automatically. Such detectors are convenient for use in non-automatic cloud point determinations and essential in the case of automatic determinations.

According to the invention a detector for detecting the end point of a cloud point determination comprises primary and secondary light guides positioned so as to project a beam of light from the primary to the secondary light guide via a sample gap and a sensor for responding to a decrease in the intensity of light emergent from the secondary light guide whereby the formation of solid particles in a sample filling the sample gap is detected by the consequential reduction in the intensity of the emergent light. The light guides may arranged so that the secondary light guide receives the light directly from the primary light guide but it is preferred to arrange them so that the secondary light guide is able to receive light indirectly from the primary light guide by reflection, said reflection taking place during the use of the detector off the wall or base of a sample container, since this is the area in which it has been found the wax formation tends to first occur.

The sensor is preferably a comparator for comparing the intensity of the incident light going into the primary light guide with the intensity of the emergent light from the secondary light guide. A suitable comparator comprises a primary photo-conductive cell for measuring the intensity of the incident light and a secondary photo-conductive cell for measuring the intensity of the emergent light, said photo-conductive cells being linked into a bridge circuit. In order to balance the bridge it is desirable to provide means for controlling the intensity of light falling on the primary photo-conductive cell.

The detector may also incorporate a temperature measuring device, e.g. a thermo-couple, having the temperature sensitive element situated in the vicinity of the sample gap. The temperature measuring device is conveniently supported by the light guides and it may be positioned in the path of the light between the two guides provided it does not obscure the light to such an extent as to make the sensor inoperative.

The sensor and the temperature measuring device are conveniently inter-connected so that the signal produced by the sensor at the end point records the temperature measured by the temperature measuring device. In the case of a detector intended for use in an automatic apparatus the detector may also incorporate a control circuit for initiating sample replacement when the end-point is detected.

The invention also includes a cloud point apparatus which comprises a sample container and an end-point detector as hereinbefore described. Preferably the detector is arranged so that the secondary light guide receives light after reflection off the base of the sample container.

The apparatus preferably incorporates thermo-electric cooling, e.g. by placing thermo-electric modules in thermal contact with the sample container. The passage of a suitable current through the thermo-electric modules removes heat from the sample and it is preferred that this cooling be applied all round and particularly at the base of the ample container. In an automatic apparatus the current source is conveniently linked with the sensor so that the cooling current is reversed upon the detection of the end-point. This arrangement provides heat to the sample as soon as the precipitation of material is detected.

An end point detector and a cloud point apparatus according to the invention will now be described by way of example with reference to the drawings in which:

FIG. 1 illustrates, in diagrammatic form a detector according to the invention,

FIG. 2 illustrates, in diagrammatic form, an alternative arrangement for detector shown in FIG. 1.

Figure 3:
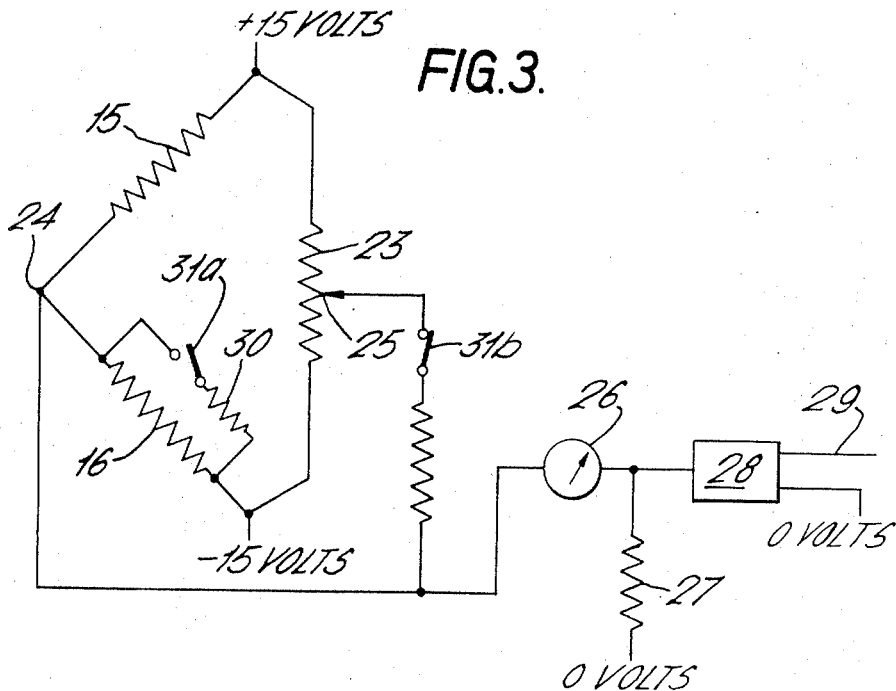
FIG. 3 illustrates the electric circuit of the sensor.

The detector shown in FIG. 1 comprises a primary light guide 10 which is coupled with a secondary light guide 11 so as to form a sample gap 12. In the use of the detector the primary light guide 10 is illuminated by a tungsten filament lamp 14 which is situated inside a housing 13. This illumination is conveyed to the sample gap 12 and after crossing the gap a portion of it is collected by the secondary light guide 11 and conveyed to a secondary photo-conductive cell 15. The formation of solid material in the sample gap 12 reduces the amount of light which passes so that the intensity of light falling on the secondary photo-conductive cell 15 is reduced. This reduction is sensed as described below.

To allow for fluctuations in the intensity of illumination produced by the tungsten lamp 14 the intensity of the incident illumination is monitored by a primary photo-conductive cell 16. The intensity of light falling on the primary photo-conductive cell 16 is adjusted by means of the screw 17 (which projects into the light beam to block of part of the illumination) so that the intensities at both photo-conductive cells can be balanced; the adjustment of screw 17 will be explained below.

All the components just mentioned are mounted on a lid 18. Placing the lid 18 on a suitable sample container provides an apparatus assembled ready for use.

We have found that it is possible to detect the end-point with great accuracy if only a small portion of the total sample is examined and this is achieved because only a small portion of the sample is situated in the sample gap 12. It is preferred to examine a portion situated as low as possible in the sample and the arrangement of light guides shown in FIG. 2 is convenient for this purpose.

The arrangement shown in FIG. 2 comprises the same components shown in FIG. 1 but the two light guides are set at an angle so that the secondary light guide 11 receives light from the primary light guide 10 after reflection, e.g. off the bottom of the sample vessel. This arrangement clearly ensures that the lowest layers in the sample affect the detection of the end-point. In this arrangement the temperature at the end-point is measured by the junction 20 of a thermo-couple. The junction 20 is situated in the sample gap 12 and positioned so that it does not obstruct the illumination passing between the two light guides to such an extent that the function of the photo-conductive cell 15 is impaired. The thermo-couple is connected to recording circuitry via the leads 21 and 22. Those leads are supported by the light guides so that they can be led into and out of the sample.

From the electrical point of view the two photo-conductive cells are resistors whose resistance varies with the intensity of illumination and FIG. 3 shows a suitable circuit for a comparator. The circuit is connected to a power supply (not shown in the drawing) which provides potentials of +15 volts, zero volts and −15 volts.

As can be seen from FIG. 3 the two photo-conductive cells 15 and 16 are connected in series with one another and in parallel with a potentiometer resistor 23. The mid point 24 between the photo-conductive cells and the zero-voltage point 25 of the potentiometer resistor 23 are both connected to one terminal of the milliameter 26 whose other terminal is connected to zero volts through the ballast resistor 27 and connected to the Schmitt trigger 28.

When the circuit is balanced, i.e. before the end point is detected, no current passes through the resistor 27 and therefore the input to the Schmitt trigger 28 is zero volts. (There may be slight departures from zero due, for example, to electrical noise and samples of varying optical density but the trigger 28 is set so as to ignore these.)

At the end point the intensity of illumination on the photoconductive cell 15 falls and therefore its resistance rises. This unbalances the bridge and gives a negative input voltage to the trigger 28 which fires and gives an output in the lead 29. In the case of a semi-automatic apparatus this output may operate an audible signal indicating the end point so that an operator may record the end point and make suitable arrangements for the next determination. The use of this signal in an automatic apparatus will be described with reference to FIG. 4.

(For purposes of adjustment as described below the zero-voltage 25 is adjustable. In addition an adjustment resistor 30 is connected in parallel with the primary photo-electric cell 16. This is provided with a ganged switch 31 which comprises switch 31a, normally open, and switch 31b, normally closed.)

Figure 4:
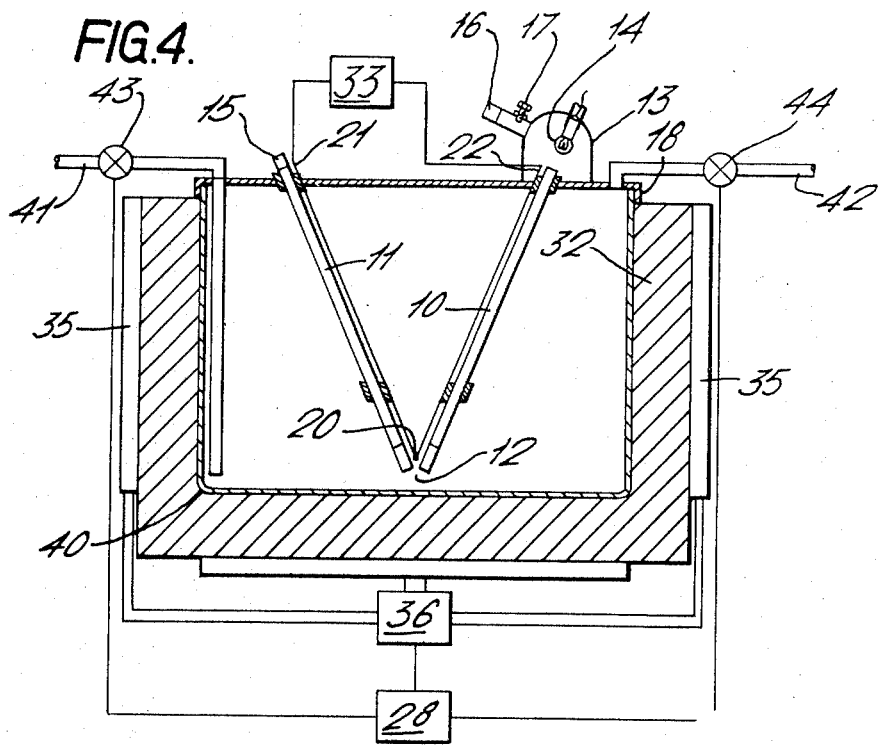
FIG. 4 illustrates an automatic apparatus incorporating the detector shown in FIG. 2 and the sensor shown in FIG. 3.

The apparatus shown in FIG. 4 is intended for on stream determination of cloud points in a refinery. In most cases the stream to be analysed has a high pressure zone and a low pressure zone and connection between these two zones overcomes the problem of sample flow and disposal of the used sample. (If a suitable pressure differential does not exist then it may be necessary to install a pump.)

The apparatus comprises a cylindrical sample container 40 and an end-point detector; the detector is as shown in FIG. 2 having an end point sensor as shown in FIG. 3. The detector is situated inside the container 40 so that light is reflected from the primary light guide 10 to the secondary light guide 11 off the base of the container 40. The light guides, the inlet 41 and the outlet 42 are all supported by a lid 18 which fits on the sample container 40 in a fluid tight manner. The inlet and outlet are provided with electro-magnetic flow valves 43 and 44; as an alternative only one may be provided, preferably in the inlet.

The container 40 fits into a cylindrical cavity in a cubical aluminum cooling block 32. The side faces and the base of this cooling block are in contact with thermoelectric cooling modules 35 (i.e. there are 5 modules) which are supplied with electric current from power source 36. The "warm side" of the modules is cooled by an arrangement not shown in the drawings.

It will be noted that the construction described above simplifies the taking to pieces of the apparatus for cleaning and servicing; in particular the sample container 40 is easily separated for cleaning.

In the use of the apparatus the sample is cooled by the modules 35 until the end point is detected and a signal produced by the trigger 28 (which, to avoid crowding the drawing is the only component of FIG. 3 shown in FIG. 4). This signal opens the electromagnetic valves 43 and 44, thereby causing a flow of sample through the apparatus. The signal also reverses the current in the modules 35 so that cooling stops and heating starts. When the old sample has been completely flushed away the valves 43 and 44 close and cooling is recommenced to start a new cycle.

The temperature in the sample gas is continuously plotted by the recorder 33 and the trace shows the fall in temperature during the cooling part of the cycle followed by the rise in temperature during the heating. These two traces intersect in a sharp spike which indicates the cloud point. As an alternative a point recorder may be used. This records only when the trigger 28 fires so that the trace is a series of dots each of which indicates the cloud point of a determination.

The cooling system has a limited capacity and therefore it cannot cool the sample below a certain temperature which represents the limit of its capacity. The cooling system must be designed so that the "limit temperature" is below the expected cloud points. However the receipt of a sample having an unexpectedly low cloud point could set up an equilibrium state in which the sample is cooled to the limit temperature, fails to precipitate wax and therefore does not fire the trigger to obtain a new sample. As a safe-guard against this the recorder 33 may be linked to the trigger 28 so as to fire it when the temperature falls to a pre-set level.

Before use, and from time to time as may be necessary during servicing, the apparatus is adjusted as follows.

1ST ADJUSTMENT

The light is extinguished and the balance point 25 adjusted until the ammeter 26 reads zero.

2ND ADJUSTMENT

With the light on and a sample of suitable optical density in the container 40 the screw 17 is adjusted until the ammeter 26 reads zero. The movement of the screw into the light beam reduces the intensity of illumination at the primary photo-conductive cell 16. This adjustment balances the light intensities at the two photo-conductive cells.

3RD ADJUSTMENT

The intensity of illumination at the two photo-cells is adjusted to a standard level as follows. The ganged switch 31 is moved to the "adjust" position in which the switch 31a is closed and 31b is open. For high light intensities the resistance of the photo-conductive cell 16 is low and therefore the resistor 30 has no effect on the balance of the bridge. Reducing the intensity of illumination increases the resistance of the photo-conductive cells 15 and 16 so that the resistor 30 becomes of significance. Thus the setting of the ammeter 26 to a standard value standardises the light intensity.

(The power supply for the lamp 14, not shown in the drawings, includes a dimmer to enable the light intensity to be adjusted.)

An apparatus as described above has been tested in the laboratory and found to give results in good agreement with the American Society for Test Methods test number T60–105.

We claim:

1. A detector for use with a sample container for containing a sample under test, for detecting the end point of a cloud point determination on the sample, which detector comprises primary and secondary light guides positioned so as to provide a sample gap therebetween and to project a beam of light from the primary to the secondary light guide via said sample gap and in which the light guides are arranged so that the secondary light guide is able to receive light indirectly from the primary light guide by reflection, said reflection taking place during the use of the detector off the base area of the sample container and a sensor for responding to a decrease in the intensity of light emergent from the secondary light guide whereby the formation of solid particles in a sample filling the same gap is detected by the consequential reduction in the intensity of the emergent light.

2. A detector according to claim 1, in which the sensor is a comparator for comparing the intensity of the incident light going into the primary light guide with the intensity of the emergent light from the secondary light guide.

3. A detector according to claim 2, in which the comparator comprises a primary photo-conductive cell for measuring the intensity of the incident light and a secondary photo-conductive cell for measuring the intensity of the emergent light, said photo-conductive cells being linked into a bridge circuit.

4. A detector according to claim 3, in which the comparator comprises means for controlling the intensity of light falling on the primary photo-conductive cell in order that the bridge may be balanced.

5. A detector according to claim 1, which also incorporates a temperature measuring device whose temperature sensitive element is situated in the vicinity of the sample gap.

6. A detector according to claim 5, in which the temperature measuring device is a thermo-couple whose measuring junction is situated in the vicinity of the sample gap.

7. A detector according to claim 6, in which the temperature measuring device is supported by the light guides in such a manner that the temperature sensitive element is located in the vicinity of the sample gap.

8. A detector according to claim 5, in which the sensor and the temperature measuring device are interconnected so that the signal produced by the sensor at the end point causes the recording of the temperature measured by the temperature measuring device.

9. A cloud point apparatus which comprises a sample container for containing a sample under test and an end-point detector as specified in claim 1 for detecting the end point, said detector being positioned in the sample container in such a manner that, during use, the secondary light guide will receive illumination from the primary light guide after reflection off the base of the sample container.

10. An apparatus according to claim 9 which incorporates thermoelectric cooling.

11. A cloud point apparatus according to claim 10 which comprises thermo-electric modules which are placed in thermal contact with the outer surface of the sample container.

12. A cloud point apparatus according to claim 11, in which the thermo-electric cooling is operatively linked with the sensor so that the cooling effect is reversed upon detection of the end point whereby unnecessary cooling and hence unnecessary precipitation is avoided.

13. A cloud point apparatus according to claim 9 in which the apparatus is an on-stream apparatus whose sample container has connections for receiving a supply of sample, said connections comprising flow control valves which are linked to the detector so that sample replacement is achieved automatically upon detection of an end point.

References Cited

UNITED STATES PATENTS

| 3,166,928 | 1/1965 | Jackson et al. | 73—17 |
| 3,188,857 | 6/1965 | Vesper et al. | 73—53 |

RICHARD C. QUEISSER, Primary Examiner

J. K. LUNSFORD, Assistant Examiner